US008971838B2

United States Patent
Dietz

(10) Patent No.: US 8,971,838 B2
(45) Date of Patent: Mar. 3, 2015

(54) ECALL DEVICE SWITCHING PROCEDURE

(75) Inventor: Ulrich Dietz, Munich (DE)

(73) Assignee: Vodafone GmbH, Duesseldorf (DE)

( * ) Notice: Subject to any disclaimer, the term of this patent is extended or adjusted under 35 U.S.C. 154(b) by 32 days.

(21) Appl. No.: 13/373,451

(22) Filed: Nov. 14, 2011

(65) Prior Publication Data

US 2012/0196560 A1 Aug. 2, 2012

(30) Foreign Application Priority Data

Nov. 12, 2010 (EP) ...................................... 10191028

(51) Int. Cl.
*H04W 4/22* (2009.01)
*H04W 76/00* (2009.01)
*G07C 5/00* (2006.01)

(52) U.S. Cl.
CPC .............. *H04W 76/007* (2013.01); *G07C 5/008* (2013.01); *H04M 2242/04* (2013.01)
USPC ........................................ 455/404.1; 707/802

(58) Field of Classification Search
USPC ........... 455/404.1, 404.2; 707/802, 29.1, 423; 340/870.02
See application file for complete search history.

(56) References Cited

U.S. PATENT DOCUMENTS 5,388,147 A * 2/1995 Grimes ...................... 455/404.2
2004/0198466 A1 10/2004 Walby et al.
2011/0302214 A1* 12/2011 Frye et al. ..................... 707/802

OTHER PUBLICATIONS

MCC: "eCall initiative," 3GPP Draft; SP-050130, 3rd Generation Partnership Project (3GPP), Mobile Competence Centre; 650, Route des Lucioles; F-06921 Sophia-Antipolis Cedex, France (Mar. 14, 2005).

* cited by examiner

*Primary Examiner* — Phuoc H Doan
(74) *Attorney, Agent, or Firm* — Kriegsman & Kriegsman

(57) ABSTRACT

A method of performing a switching procedure of an eCall device from a first state of activity to a second state of activity whereby details of the switching procedure are preferably stored in a report file. The report file is preferably stored in a storage unit which can be part of a database. Furthermore, the present invention relates to an eCall device being adapted for performing a switching procedure from a first state of activity to a second state of activity and relates to a backend unit being adapted for supporting a switching procedure of an eCall device from a first state of activity to a second state of activity. Beyond the present invention relates to an eCall system being adapted for performing a switching procedure of an eCall device from a first state of activity to a second state of activity.

14 Claims, 1 Drawing Sheet

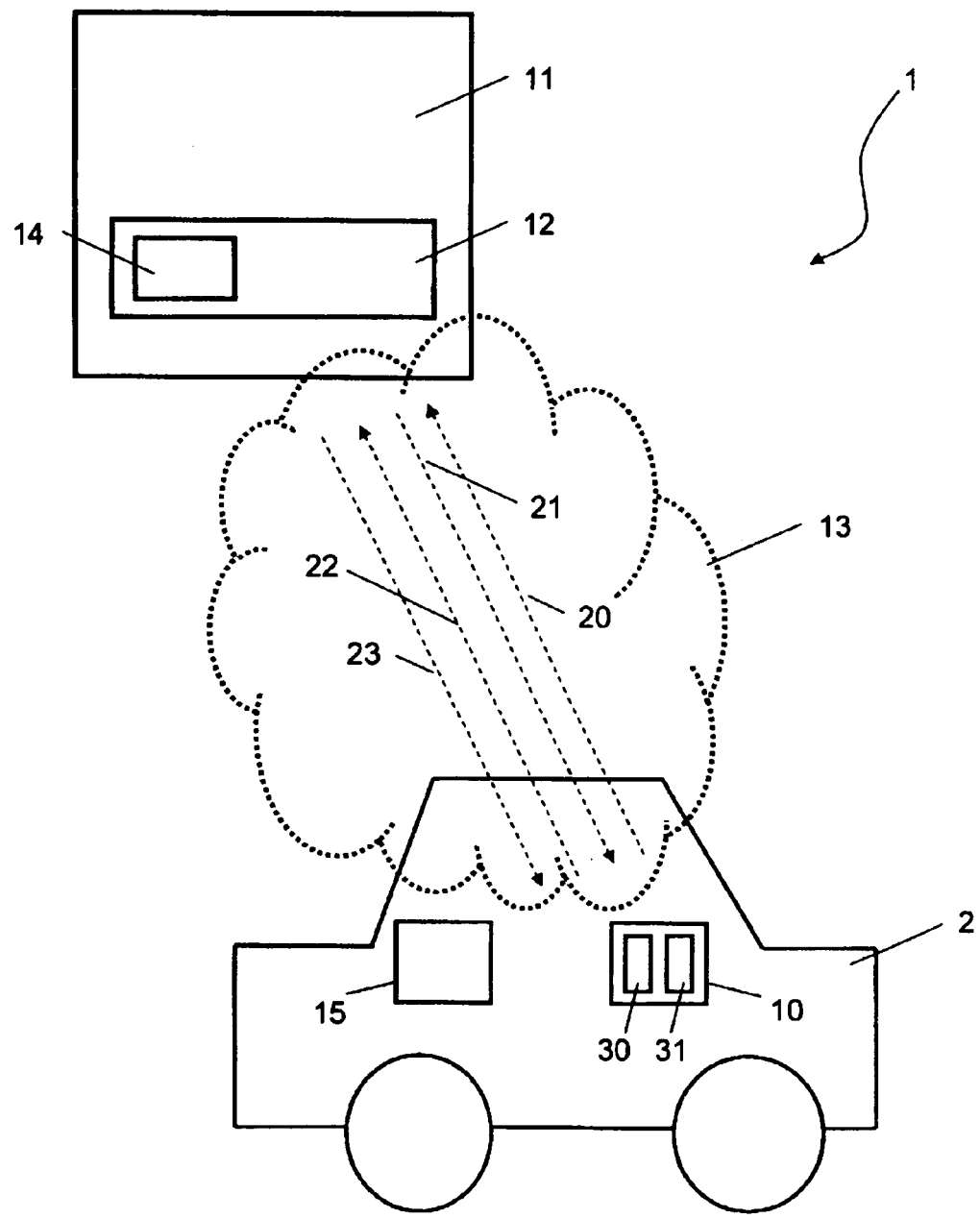

ECALL DEVICE SWITCHING PROCEDURE

BACKGROUND OF THE INVENTION

The present invention relates to a method of performing a switching procedure of an eCall device from a first state of activity to a second state of activity according to the preamble of independent claim 1. Furthermore, the present invention relates to an eCall device being adapted for performing a switching procedure from a first state of activity to a second state of activity according to the preamble of independent claim 12. Beyond the present invention relates to a backend unit being adapted for supporting a switching procedure of an eCall device from a first state of activity to a second state of activity according to the preamble of independent claim 13. And the present invention relates to an eCall system being adapted for performing a switching procedure of an eCall device from a first state of activity to a second state of activity according to the preamble of independent claim 14.

It is already known to use eCall devices; such eCall devices can for example be installed within a vehicle. Usually an eCall device is active in case of an emergency situation. In such a case the eCall device sends an emergency message to a control station. A control station can be for example a service centre, a call centre, a Public Safety Answering Point (PSAP) or the like. For a secure and faithful use, a few requirements with regard to such eCall devices have to be fulfilled. For example, the user of the eCall device must have the possibility to switch-off the eCall device. Additionally, it must be avoided that the eCall device can be tracked in case that it is not used, when the user for example doesn't want to have eCall operational on board.

If the user switched off his eCall device, it might be important for the operator or the provider of that system, for example the operator of a telecommunications network, a car manufacturer, an insurance company or the like, to get a proof that it was the user who switched off the eCall device. It might be important for the operator to prove that, in case of an emergency situation, it was not a malfunction of the eCall device that prevented the eCall device from transmitting an eCall message.

If the eCall device is switched off, vehicle manufactures fear that they are sued by the users for example, who had switched off the eCall device but, after an accident, don't remember this. So, it is a difficult situation for the manufactures to prove the correct implementation of the eCall device.

SUMMARY OF THE INVENTION

It is the object of the present invention to avoid disadvantages in the prior art and particularly to provide a method by use of which it can be proved that an eCall device has been switched off.

In accordance with the present invention, this object is solved by the method with the features according to the independent claim 1 and the eCall device according to the independent claim 12, the backend unit according to the independent claim 13 and the eCall system according to the independent claim 14.

Additional features and details of the present invention become apparent from the dependent claims, from the description and from the drawing. Features and details described in connection with the method according to the first aspect of the invention are, of course, also valid in connection with the eCall device according to the second aspect of the invention and the backend unit according to the third aspect of the invention and the eCall system according to the forth aspect of the invention, and vice versa. Features and details described in connection with the eCall unit according to the second aspect of the invention are, of course, also valid in connection with the backend unit according to the third aspect of the invention and the eCall system according to the forth aspect of the invention, and vice versa. Features and details described in connection with the backend unit according to the third aspect of the invention are, of course, also valid in connection with the eCall system according to the forth aspect of the invention, and vice versa. Thus, in respect of the disclosure of one of the aspects of the present invention, full reference is always made reciprocally to the disclosure of each other aspect of the present invention.

Generally the present invention relates to a method where the eCall device communicates with a backend unit if the state of activity of the eCall device is changed by for example the driver and this change of state is documented to prove the correct implementation of the eCall device.

Pursuant to a first aspect of the present invention the object is solved by a method of performing a switching procedure of an eCall device from a first state of activity to a second state of activity. Therefore a communication link is set up between the eCall device and a backend unit, an individual communication process relating to the switching procedure is performed between the eCall device and the backend unit, a report file relating to the switching procedure is generated during the individual communication process and the report file is stored within a storage unit.

"eCall" is a pan European project which intends to bring rapid assistance to motorists involved in a collision anywhere in the European Union. The project intends a hardware black box installed in vehicles. This black box comprises a communication module which is adapted to wirelessly send vehicle sensor information, such as airbag deployment and impact sensor information and the like, as well as GPS coordinates of the vehicle to local emergency agencies, for example the Public Safety Answering Points.

An "eCall device" is a device which can be installed for example in a vehicle and by use of which such eCall can be performed, particularly in an emergency case. The present invention is not limited to eCall devices installed in a vehicle. An eCall device can be any kind of device for performing an eCall.

A "vehicle" for example can be any kind of vehicle, like cars, trucks, busses, trains and so on. Also possible are any kind of ships or airplanes or the like. The present invention is not limited to any kind of vehicles.

An "emergency case" can be any kind of emergency case. Particularly it could be an accident.

An eCall can be performed automatically. Furthermore the user is able to trigger a manual eCall. The present invention is not limited to any kind of performing an eCall. For example, an eCall can also be performed by a combination of automatically and manually performance of an eCall.

A "switching procedure" can be for example a procedure where the actual state or status of the eCall device should be changed. In such situation the state, which can also be a status for example, of an eCall device should be changed from a first state of activity to a second state of activity. A switching procedure related to the invention can for example be a procedure of switching off the eCall device or a procedure of switching on the eCall device. For a procedure of switching off the eCall device, the eCall device can particularly be switched on before. For a procedure of switching on the eCall device, the eCall device can particularly be switched off before.

In particular, "switched off" related to the present invention is understood in a way, that an eCall can't be performed by the eCall device because the eCall device is switched off by the user. "Switched on" related to the present invention is understood in a way, that an eCall can be performed by the eCall device because the eCall device is switched on.

According to the present invention a "state of activity" can be every state of the device. The state can particularly be an active state but also an idle mode. A "state" can be a mode, a session or a status. "Active" can be understood in the present invention as the selected state for example. The "eCall device is active" can mean that the selected state of the eCall device is active particularly at the moment.

The communication according to the present invention is a possibility for at least two devices to communicate with each other or together. Therefore the devices can particularly comprise an interface for the communication. The communication link can be set up and/or can be installed and/or can exist the whole time, but it is also possible that the communication link is installed and/or exists only upon request. Particularly it is possible that the communication link is installed and/or exists only temporarily. A disconnection between the at least two devices is possible after the communication is completed. It is also possible that the disconnection between the at least two devices is performed actively, upon request or order, but it is also possible that the disconnection is performed by other circumstances like a dead spot or the like. Preferably a communication link is performed or set up or installed between the eCall device and a backend unit. After the communication link is set up the eCall device and the backend unit can communicate with each other. The communication can be particularly a data transfer via interfaces from the eCall device to the backend unit and vice versa.

Via the communication link an individual communication process between at least two participants can be performed. "Individual" means that all participants can send, receive, retrieve or the like information. If one participant sends information, a second participant can for example receive this information. It is also possible that via an individual communication process one participant can retrieve information or data from a second or another participant of the communication.

Particularly the individual communication process is related to the switching procedure whereby a switch from a first state of activity to a second state of activity should be performed or is prepared to be performed or is performed. The switching procedure is particularly performed within the eCall device. However, an additional communication process with the backend unit takes place.

Particularly the "backend unit" is a unit where information can be processed and/or stored for example. "Information" can also be data, requests or the like. A backend unit can be particularly a control centre. For example, a control centre of a car manufacturer or a control centre of a mobile radio telecommunication network provider. The present invention is not limited to specific types of backend units.

A "report file" can be a report file wherein information can be included. This information can be information or data or the like about the switching procedure. The report file can include any kind of data or information and is not limited or restricted to special kind of information or data. For example the date, especially the date and a time stamp of a communication between the eCall device and the backend unit and vice versa can be included in the report or can be a part of the report. Preferably the date and/or the time stamp is secured by a digital signature. The report file is particularly generated during the switching procedure. If for example several communications are preformed between the eCall device and the backend unit, more than one report file can be generated. Finally all the generated report files can be possibly joined to one report file. Each report file is particularly related to the switching procedure, so a report file particularly comprises information or data relating to the switching procedure. A report file is particularly generated, which can also mean created and/or temporarily or long time stored, during the switching procedure. As already mentioned above a report file can be generated during or after each communication step between the eCall device and the backend unit. Finally each report file, generated for example during steps of the switching procedure, can be joined together to one final report file. The report file can also be generated after the switching procedure when all actions for performing the switching procedure are performed. In such case, the information or data is particularly stored temporarily in the eCall device and/or in the backend unit. It is also possible that the information or data for generating the report file are sent and/or transmitted and/or received and/or retrieved by the part, which generates the report file.

For solving the object of the present invention, the report file is or all report files are stored within a storage unit. Such storage unit can be located for example within the eCall device and/or the backend unit and/or the storage unit can be located externally from the eCall device and/or the backend unit. If the storage unit is located externally from the eCall device and/or the backend unit, the eCall device and/or the backend unit comprise particularly an interface for having access to the storage unit where the report file can be stored. The invention is not limited to special location of the storage unit and/or types of storage units. Particularly the storage unit is a database or a part of a database. For example the storage unit can be part of a Subscriber Identity Module (SIM). The Subscriber Identity Module can also be a Subscriber Identity Module-card, which is also known as SIM-card. Preferably, such a Subscriber Identity Module can be arranged within the eCall device.

For security reasons, the eCall device preferably does not switch off without being logged by the backend unit as described above.

However, if the eCall device is switched off and shall be switched on, the eCall device can preferably be immediately switched on and continues to communicate to that to the backend unit until it succeeds. This attempt can be stored in the eCall device, for example on a Subscriber Identity Module for forensic use. The Subscriber Identity Module can also be a Subscriber Identity Module-card, which is also known as SIM-card.

According to one preferred embodiment of the present invention, an information message related to performing the switching procedure is transmitted from the eCall device to the backend unit and a first confirmation message related to the received information message is transmitted from the backend unit to the eCall device during the individual communication process.

For performing the switching procedure an information message from the eCall device can be sent to the backend unit. Such information message comprises particularly request and/or general information that the eCall device wants to change its state of activity. The eCall device can send actively or passive upon request a message wherein the eCall device informs a device, particularly the backend unit, that a switching procedure or a change of the state of activity is performed or should be performed or will be performed.

Based on an information message, particularly based on the above-mentioned information message sent from the eCall device to the backend unit, the backend unit sends a first confirmation message, particularly back to the eCall device. This first confirmation message can comprise information that the backend unit received the information message, sent from the eCall device to the backend unit, and that the backend unit allows the eCall device to perform the switching procedure. The first confirmation message particularly comprises information about the receiving of the information message and information that the switching procedure can be performed. The first confirmation message is not limited to any kind of content. The first confirmation message can particularly comprise information for the eCall device that the switching procedure can be performed.

The first confirmation message can particularly comprise information from the backend unit for the eCall device that the switching procedure can be performed. The switching procedure can be started or initialised, particularly by the eCall device.

According to another preferred embodiment of the present invention, the eCall device switches from the first state of activity to the second state of activity after the eCall device has received the first confirmation message.

In particular, after the eCall device has received the first confirmation message with content, that the switching procedure can be performed, the eCall device switches from the first state of activity to the second state of activity. The switching procedure can for example be a switching procedure for switching the eCall device from the state of activity "on" to the state of activity "off" and vice versa, as already mentioned above.

According to another preferred embodiment of the present invention, the eCall device transmits a switching completion message to the backend unit after the eCall device has switched from the first state of activity to the second state of activity.

After the eCall device has received the permission for performing the switching procedure in the form of the first confirmation message, the switching procedure is performed. "Performed" is particularly understood in a way, that the switching procedure is started or triggered or the like. After the switching procedure is successfully performed the eCall device can transmit a second message, a switching completion message, to the backend unit to inform the backend unit about the fulfilling of the switching procedure.

In case that the switching procedure could not be completely performed, the eCall device can send a switching completion message to inform the backend unit that the switching procedure is not fulfilled or completed. In such case the switching completion message can be understood as a switching in-completion message. With such message in such case the backend unit is informed about the actual state of the eCall device. For example, this can be used to report and/or monitor malfunctioning eCall devices. Furthermore such eCall devices can display their malfunction to the user and/or store that state of malfunction within the storage unit, for example on the Subscriber Identity Module (SIM) and/or report that to the backend unit for further use.

The switching completion message can comprise information about the state of the switching procedure. Preferably the switching completion message comprises information that the switching procedure is or was performed successfully.

According to another preferred embodiment of the present invention, the backend unit transmits a second confirmation message to the eCall device. The second confirmation message comprises information that the switching procedure is completed.

After the backend unit received the switching completion message, the backend unit can send a second confirmation message particularly back to the eCall device. This second confirmation message can comprise information or data to inform the eCall device that the switching procedure, that is the switch from a first state of activity to a second state of activity, is successfully performed. If the switching procedure is not completed or successfully completed, it is possible that with the second confirmation message the backend unit wants actively to retrieve or receive additional information about the state of activity. With the second information message, the backend unit can particularly request or ask for the reasons why the switching procedure could not performed.

By sending the second confirmation message both devices, the eCall device and the backend unit are informed about the switching procedure and/or the state of activity of the eCall device.

According to another preferred embodiment of the present invention, the report file is generated based in the first confirmation message and/or the switching completion message and/or the second confirmation message.

As already mentioned above the report file which can be stored in the storage unit can comprise information about the switching procedure like date and/or time and/or the state of activity of the eCall device. This information or the content of the report file can be generated out of the first confirmation message and/or the switching completion message and/or the second confirmation message. All information of one message or a combination of these messages can be included or can be part of the report file. It is also possible that the information of one message or a combination of these messages can be the report file. In this case the corresponding messages are joined together to one report file. So the report file can comprise one or all messages or the report file can consist of one or all messages. It is also possible that the report file can comprise part of one or all messages or the report files can consist of one part or several parts of one or all messages. The report file is not limited to specific types of messages or specific parts of the messages.

According to another preferred embodiment of the present invention, the switching procedure is performed as an atomical process. "Atomical" is a well known term in the field of telecommunication or computer science and is a method of computer science, that in a system no undefined states can occur. It is also possible that the switching procedure is performed atomically, so that every step can be redone anyway in the process and any disruption does not affect the outcome of the process. An atomical process is created to handle with undefined process in computer sciences because such undefined processes result in a kind of repeating loops or circles. If the switching procedure is performed as an atomical process the switching procedure cannot be in an undefined state of activity. Particularly, if the switching procedure is interrupted by an interrupted communication link, the eCall device does not know how to handle or deal with the new situation. A corresponding behaviour can also be possible regarding the backend unit. If the switching procedure is performed as an atomical process, the eCall device and the backend unit know how to handle for example an interruption of an existing communication link or a switching procedure.

According to another preferred embodiment of the present invention, it is checked by the eCall device and/or the backend unit whether an active communication link between the eCall device and the backend unit exists and the switching procedure is performed during said existing active communication link.

"Checked" in the present invention is particularly understood in a way, that the eCall device and/or the backend unit control whether an active communication link between the eCall device and the backend unit exists. So before the switching procedure is tried to be performed it is checked or controlled whether a communication link between the at least two communication participants exists. This can be particularly performed via sending a request message to another communication participant. It is also possible that all communication participants send such message to check whether the communication link exists. It is also possible that only a selection or some of the communication participants send such messages for checking whether such communication link exists. By such checking it is just checked whether a communication link for the communication between the communication participants is possible. Particularly by the eCall device with the information message.

If no active communication link can be generated or established the active state of activity of the eCall device is not changed. Instead, the eCall device and/or the backend unit try to generate or establish an active communication link for performing the switching procedure again. This re-performing of the switching procedure can be done automatically or upon request or after an additional activation by the user. Important is that the state of activity of the eCall device is particularly not changed if the active communication link is aborted or interrupted or disrupted. The state of activity of the eCall device is preferably changed and so the switching procedure fulfilled and finished only when the switching completion message is transferred from the eCall device to the backend unit. More preferred, the state of activity of the eCall device is changed and so the switching procedure is fulfilled and finished only when the second confirmation message is transferred from the backend unit to the eCall device. Preferably, the aforesaid procedure is performed if the eCall device is to be switched off. In case that the eCall device is to be switched on and the active communication link is aborted or interrupted or disrupted, the eCall device can be immediately switched on anyway. In particular, this is for safety reasons. This attempt can be stored in the eCall device, for example on a Subscriber Identity Module for forensic use. Once, the active communication link is set up, the switch on procedure is reported as mentioned above.

According to another preferred embodiment of the present invention, the state of activity of the eCall device and/or the current status of the switching procedure is graphically and/or acoustically output on an output device and the output device is allocated to the eCall device.

Preferably, all steps of the switching procedure are and/or the state of activity is displayed to the user.

During the switching procedure is can be possible that the state of activity of the eCall device and/or the current status of the switching procedure is output that for example the driver is informed about the current status of the switching procedure. The current status can be every kind of status. For example the current status can be the status that the switching procedure is currently performed and/or is initiated to be performed and/or the switching procedure is successfully performed and completed or aborted due to special circumstances. The switching procedure can be aborted for example by the user or due an aborted communication link between the eCall device and the backend unit.

The output can be performed graphically on a display, whereas the invention is not limited to special types of displays. The display can be for example a display in the vehicle or a display on a mobile device such as a navigation device or a mobile phone.

It is also possible that the current status of the switching procedure is acoustically output. This can be done by loudspeakers or speakers which can be located anywhere. Particularly the speakers are located in the vehicle or in the mobile device.

It is also possible that a combination of graphical or acoustical output of the current status of the switching procedure is performed.

According to another preferred embodiment of the present invention, the eCall device is a mobile device, the eCall device is preferably arranged within a vehicle, the backend unit is remotely located from the mobile eCall device and the communication link is set up between said mobile eCall device and said remote backend unit.

The eCall device is a mobile device which can be arranged within a vehicle, whereas the vehicle can be any kind of vehicle as already mentioned above. Preferably the backend unit is not located in the vehicle. Instead the backend unit is preferably located somewhere else and the eCall device and the backend unit communicate via a communication link with each other and the information is transmitted via said communication link. The backend unit can be located anywhere. It is only necessary, that the eCall device and the backend unit can communicate with each other.

According to another preferred embodiment of the present invention, the communication link is set up via a communication network. The communication network for performing the communication between the eCall device and the backend unit can be any kind of communication network. Preferably the communication network is a mobile radio telecommunication network, which is well known in daily life.

According to a second aspect of the invention, an eCall device is disclosed. This eCall device is adapted for performing a switching procedure from a first state of activity to a second state of activity. The eCall device comprises an interface to a backend unit for setting up a communication link between the eCall device and the backend unit, means for performing an individual communication process relating to the switching procedure with the backend unit, means for processing a report file relating to the switching procedure during the individual communication process, and an interface to a storage unit for storing the report file.

The eCall device for performing a switching procedure from a first state of activity to a second state of activity comprises an interface to a backend unit for setting up a communication link between the eCall device and the backend unit. Via this interface a communication between the eCall device and the backend unit is possible via a communication link.

Additionally the eCall device comprises means for performing an individual communication process relating to the switching procedure with the backend unit. So during the individual communication process information can be particularly exchanged between the eCall device and the backend unit. This information can be any kind of message which can comprise information about the switching procedure like information about the current status of the switching procedure.

In particular, the eCall device is adapted for possessing malfunction behaviour as being described with regard to the method according to the present invention.

Preferably the eCall device comprises means for processing a report file relating to the switching procedure during the individual communication process. Processing is understood in the way, that the report file can for example be sent to and/or is received to and/or generated by and/or modified by the eCall device. The report file can comprise information as already mentioned above. Preferably, the report can be processed and stored locally, for example within the eCall device, for reasons of the independence of communication and/or for forensic use.

The eCall device can also comprise an interface to a storage unit for storing the report file. This interface can for example be an internal interface, especially when the storage unit is an internal storage unit, so stored in the eCall device. The interface can also be an external interface when the storage unit is an external storage unit located for example in the backend unit or somewhere else.

Preferably the eCall device comprises means for performing the above-mentioned method.

According to a third aspect of the invention, a backend unit is disclosed. This backend unit is adapted for supporting a switching procedure of an eCall device from a first state of activity to a second state of activity. The backend unit comprises an interface to an eCall device for setting up a communication link between the backend unit and the eCall device, means for performing an individual communication process relating to the switching procedure with the eCall device, means for processing a report file relating to the switching procedure during the individual communication process, and an interface to a storage unit for storing the report file.

The backend unit for supporting a switching procedure from a first state of activity to a second state of activity comprises an interface to an eCall device for setting up a communication link between the backend unit and the eCall device. Via this interface a communication between the backend unit and eCall device is possible via a communication link.

Additionally the backend unit comprises means for performing an individual communication process relating to the switching procedure with the eCall device. So during the individual communication process information can be particularly exchanged between the backend unit and the eCall device. This information can be any kind of message which can comprise information about the switching procedure like information about the current status of the switching procedure.

Preferably the backend unit comprises means for processing a report file relating to the switching procedure during the individual communication process. Processing is understood in the way, that the report file can for example be sent to and/or is received by and/or generated by and/or modified by the backend unit. The report file can comprise information as already mentioned above.

The backend unit can also comprise in interface to a storage unit for storing the report file. This interface can for example be an internal interface, especially when the storage unit is an internal storage unit, so stored in the backend unit. The interface can also be an external interface when the storage unit is an external storage unit located for example in the eCall device or somewhere else.

Preferably the backend unit comprises means for performing the above-mentioned method.

According to a forth aspect of the invention, an eCall system is disclosed. The eCall system is adapted for performing a switching procedure of an eCall device from a first state of activity to a second state of activity, said eCall system comprising at least one eCall device, at least one backend unit, means for setting up a communication link between the eCall device and the backend unit, means for performing an individual communication process relating to the switching procedure between the eCall device and the backend unit, means for generating a report file relating to the switching procedure during the individual communication process, and a storage unit for storing the report file.

With the eCall system the process or procedure of switching the eCall device from a first state of activity to a second state of activity can be performed. Therefore the eCall device of the eCall system can send an information message to a backend unit after an active communication link is established or generated. Based on this information message the backend unit can send a first confirmation message back to the eCall device to inform the eCall device that the switching procedure can be performed. In the following the eCall device can perform the switching procedure and after performing the switching procedure the eCall device can send a switching completion message back to the backend unit to inform the backend unit that the switching procedure was performed. If the switching procedure could not be performed the eCall device can also inform the backend unit about the not fulfilled switching procedure. A second confirmation message can be sent from the backend unit to the eCall device to inform the eCall device particularly about the receiving of the switching completion message and to finally finish the switching procedure. After the second confirmation message all participants of the switching procedure, particularly the eCall device and the backend unit are informed about the switching procedure and know all details about the switching procedure.

According to another preferred embodiment of the present invention, the eCall system comprises an eCall device according to the abovementioned aspects and/or a backend unit according to the abovementioned aspects and/or means for performing the method according to the abovementioned aspects.

This communication or handshake procedure makes it possible for the vehicle manufacturer that the vehicle manufacturer has fulfilled the legal and regulatory obligations.

It is also possible that the information about the switching procedure, which can be a switch on or a switch off procedure is stored on a SIM-card of the eCall system and/or on a secure storage unit within the eCall device. The storage unit can be located within the eCall device and/or the backend unit and/or somewhere else. Locating the storage unit in the eCall device can be especially for forensic use in case of an accident without an eCall being sent, useful or important.

It is also possible, that the switching procedure, which can be a switch on or a switch off procedure is reported to for example a vehicle manufactures service centre were the information is stored in a database. This is an example for a database stored in a storage unit not located the eCall device or the backend unit.

Preferably the switching procedure is only possible in a secure state, particularly when the eCall device is not moving, for example after stopping, and the outcome and possible failures can be reported and or displayed to the user especially in case of failures.

If no communication link between the eCall device and the backend unit can be generated, it is possible that the user of the eCall device is informed about the status or the failure. The user can be informed that the switching procedure can't be performed due to special reasons. Particularly, the eCall device remains in the active state if the case occurs that a switching procedure should be generated but no communication link can be generated. In such case the user can be informed about the failure or the eCall device and/or the backend unit try to generate a communication link permanently until the generation of a communication link is possible.

Preferably the switching procedure is only possible in a secure state, particularly when the eCall device is not moving, for example after stopping, and the outcome and possible failures can be reported and or displayed to the user especially in case of failures.

The present invention relates particularly to a method of performing a switching procedure of an eCall device from a first state of activity to a second state of activity whereby details of the switching procedure are preferably stored in a report file, said report file is preferably stored in a storage unit which can be part of a database. Furthermore, the present invention relates to an eCall device being adapted for performing a switching procedure from a first state of activity to a second state of activity and relates to a backend unit being adapted for supporting a switching procedure of an eCall device from a first state of activity to a second state of activity. Beyond the present invention relates to an eCall system being adapted for performing a switching procedure of an eCall device from a first state of activity to a second state of activity.

BRIEF DESCRIPTION OF THE DRAWINGS

For a better understanding of the present invention, a preferred embodiment of the present invention will now be described by way of an example with reference to the description and the accompanying drawing, in which FIG. 1 is a schematic view of an eCall system comprising an eCall device and a backend unit according to the present invention

DETAILED DESCRIPTION OF THE DRAWING

In FIG. 1 a schematic view of an eCall system 1 comprising an eCall device 10 and a backend unit 11 according to the present invention is shown.

The shown eCall system 1 comprises beside the eCall device 10 and the backend unit 11 a storage unit 12 which is located in the backend unit 11 and a vehicle 2, where the eCall device 10 is located.

If the driver of the vehicle 2 wants to switch off the eCall device 10, what means for example the switching procedure from a first state of activity 30 to a second state of activity 31 of the eCall device 10, the eCall device 10 should report the switch off procedure beginning or it being successfully fulfilled, in an individual communication process with the backend unit 11.

If the driver of the vehicle 2 wants to switch from the first state of activity 30 of the eCall device 10 to a second state of activity 31 of the eCall device 10, the eCall device 10 preferably generates a communication link 13 to the backend unit 11 and sends an information message 20 from the eCall device 10 to the backend unit 11.

After the backend unit 11 received the information message 20, and now is informed that the eCall device 10 wants to switch from a first state of activity 30 to a second state of activity 31, the backend unit 11 sends a first confirmation message 21 back to the eCall device 10 via the communication link 13.

By receiving the first confirmation message 21, the eCall device 10 is informed that the backend unit 11 received the information message 20 from the eCall device 10 and allows the eCall device 10 to start the switching procedure.

After the eCall device 10 switched from a first state of activity 30 to another state of activity 31, the eCall device 10 can send a switching completion message 22 via the communication link 13 to the backend unit 11 to inform the backend unit 11 that the switching procedure is fulfilled.

Preferably it is possible that the backend unit 11 sends a second confirmation message 23 from the backend unit 11 to the eCall device 10, wherein the backend unit 11 informs the eCall device 10 that the switching completion message 22 was received. With the second confirmation message 23 the backend unit 11 confirms the receiving of the switching completion message 22 towards the eCall device 10 to ensure that the backend unit 11 and the eCall device 10 have the same information.

Particularly, all messages are sent via the communication link 13.

It is possible that the driver of the vehicle 2 is informed about the switching procedure partially or the whole time. The driver of the vehicle 2 can be informed by displaying information to the driver of the vehicle 2. The information for example can be displayed graphically on an output device 15 which can be located in the vehicle 2. The driver of the vehicle 2 can also be informed by an acoustically output device 15 which can also be located in the vehicle 2. Preferably the output device 15 comprises means for a graphical and an acoustical output.

Preferably, the eCall system 1 comprises a storage unit 12 which is located in the backend unit 11. During the switching procedure, the transmitted messages 20, 21, 22, 23 can completely stored, or only selected messages 20 and/or 21 and/or 22 and/or 23 can be stored in the storage unit 12. While storing, the transmitted messages 20, 21, 22, 23 can be used to generate a report file 14 which can also be stored in the storage unit 12. The storage unit 12 can be a database or can be a part of a database.

The report file 14 can comprise for example date and/or time and/or additional information, like a digital signature about the switching procedure. For example, the report file 14 can comprise parts of the transmitted messages 20, 21, 22, 23 or the complete transmitted messages 20, 21, 22, 23.

It is also possible that the eCall system 1 behaves atomically, so that every step can be redone anyway in the process and any disruption does not affect the outcome of the process.

The intention by the driver of the vehicle 2 or the user of the eCall device 10 is first relayed to the vehicle 2 manufacturer's and/or the operator's database. After the information message 20 is sent from the eCall device 10 to the backend unit 11, a signal, particularly for example a first confirmation message 21, is sent back to the eCall device 10 that now switches off the eCall device 10 and this is reported back by sending a switching completion message 22 and stored in a database which can be located in the storage unit 12. Preferably the second confirmation message 23 is sent.

This communication or handshake procedure makes it possible for the vehicle 2 manufacturer that the vehicle manufacturer has fulfilled the legal and regulatory obligations.

It is also possible that the information about the switching procedure, which can be a switch on or a switch off procedure is stored on a Subscriber Identity Module (SIM) of the eCall device 10 and/or on a secure storage unit 12 within the eCall device 10. The storage unit 12 can be located within the eCall device 10 and/or the backend unit 11 and/or somewhere else. Locating the storage unit 10 in the eCall device 10 can be especially for forensic use in case of an accident without an eCall being sent, useful or important.

It is also possible, that the switching procedure, which can be a switch on or a switch off procedure is reported to a vehicle 2 manufactures service centre were the information is stored in a database. This is an example for a database stored in a storage unit 12 not located the eCall device 10 or the backend unit 11.

Preferably the switching procedure is only possible in a secure state, particularly when the eCall device 10 is not moving, for example after stopping, and the outcome and possible failures can be reported and or displayed to the user especially in case of failures.

LIST OF REFERENCE NUMERALS

1 eCall system
2 vehicle
10 eCall device
11 backend unit
12 storage unit
13 (active) communication link
14 report file
15 output device
20 information massage
21 first confirmation message
22 switching completion message
23 second confirmation massage
30 first state of activity
31 second state of activity

The invention claimed is:

1. A method of performing a switching procedure of an eCall device from a first state of activity to a second state of activity where the actual state or status of the eCall device is changed from switched-on to switched off, or vice versa, characterised in that a communication link is set up between the eCall device and a control centre, that an individual communication process relating to the switching procedure is performed between the eCall device and the control centre, said switching procedure performing a switch from a first state of activity to a second state of activity of the eCall device, that a report file about the switching procedure is generated during the individual communication process and that the report file is stored within a storage unit.

2. The method according to claim 1, characterized in that during the individual communication process an information message related to performing the switching procedure is transmitted from the eCall device to the control centre and that a first confirmation message related to the received information message is transmitted from the control centre to the eCall device.

3. The method according to claim 2, characterized in that after the eCall device has received the first confirmation message, the eCall device switches from the first state of activity to the second state of activity.

4. The method according to claim 3, characterized in that after the eCall device has switched from the first state of activity to the second state of activity, the eCall device transmits a switching completion message to the control centre.

5. The method according to claim 4, characterized in that the control centre transmits a second confirmation message to the eCall device, said second confirmation message comprising information that the switching procedure is completed.

6. The method according claim 2, characterized in that the report file is generated based on the first confirmation message and/or the switching completion message and/or the second confirmation message.

7. The method according to claim 1, characterized in that the switching procedure is performed as an atomical process.

8. The method according to claim 1, characterized in that it is checked by the eCall device and/or the control centre whether an active communication link between the eCall device and the control centre exists and that the switching procedure is performed during said existing active communication link.

9. The method according to claim 1, characterized in that the state of activity of the eCall device and/or the current status of the switching procedure is graphically and/or acoustically output on an output device, said output device being allocated to said eCall device.

10. The method according to claim 1, characterized in that the eCall device is a mobile device, that the eCall device is preferably arranged within a vehicle, that the control centre is remotely located from the mobile eCall device and that the communication link is set up between said mobile eCall device and said remote control centre.

11. The method according to claim 1, characterized in that the communication link is set up via a communication network, particularly via a mobile radio telecommunication network.

12. An eCall device being adapted for performing a switching procedure from a first state of activity to a second state of activity, where the actual state or status of the eCall device is changed from switched-on to switched-off, or vice versa, said eCall device comprising an interface to a control centre for setting up a communication link between the eCall device and the control centre, means for performing an individual communication process relating to the switching procedure with the control centre, said switching procedure performing a switch from a first state of activity to a second state of activity of the eCall device, means for processing a report file about the switching procedure during the individual communication process, and an interface to a storage unit for storing the report file.

13. A control centre being adapted for supporting a switching procedure of an eCall device from a first state of activity to a second state of activity, where the actual state or status of the eCall device is changed from switched-on to switched-off, or vice versa, said control centre comprising an interface to an eCall device for setting up a communication link between the control centre and the eCall device, means for performing an individual communication process relating to the switching procedure with the eCall device, said switching procedure performing a switch from a first state of activity to a second state of activity of the eCall device, means for processing a report file about the switching procedure during the individual communication process, and an interface to a storage unit for storing the report file.

14. An eCall system being adapted for performing a switching procedure of an eCall device from a first state of activity to a second state of activity, where the actual state or status of the eCall device is changed from switched-on to switched-off, or vice versa, said eCall system comprising at least one eCall device, at least one control centre, means for setting up a communication link between the eCall device and the control centre, means for performing an individual communication process relating to the switching procedure between the eCall device and the control centre, said switching procedure performing a switch from a first state of activity to a second state of activity of the eCall device, means for generating a report file about the switching procedure during the individual communication process, and a storage unit for storing the report file.

* * * * *